March 27, 1928.　　　　　　　　　　　　　　　　　　　　1,664,287
F. P. DUNN
BRAKING DEVICE
Filed Nov. 2, 1926
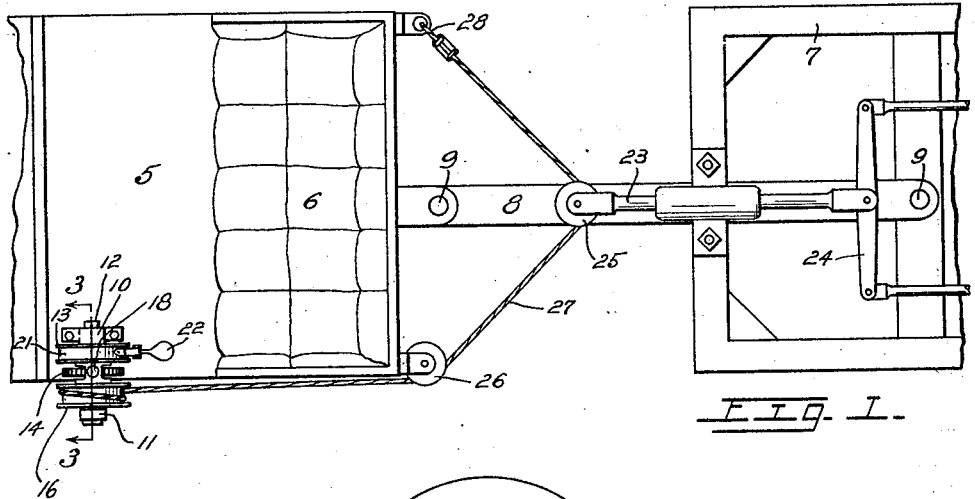
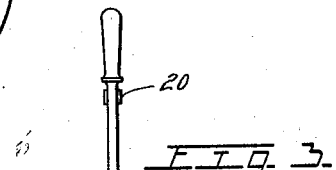
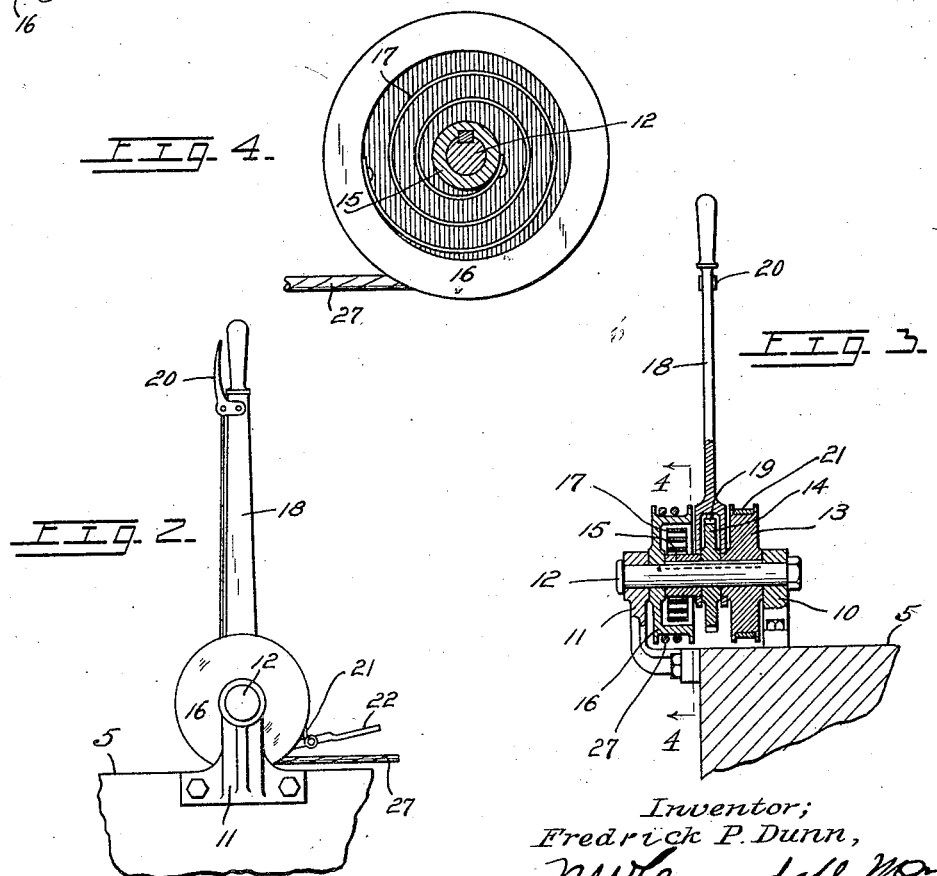
Inventor;
Fredrick P. Dunn,
per N.W. Crandall
Attorney.

Patented Mar. 27, 1928.

1,664,287

UNITED STATES PATENT OFFICE.

FREDRICK P. DUNN, OF LOS ANGELES, CALIFORNIA.

BRAKING DEVICE.

Application filed November 2, 1926. Serial No. 145,843.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to braking devices, and is particularly adapted for operating brakes on vehicle trailers. The principal objects of the invention are; first, to provide the driver of a tractor vehicle with controllable means for braking a trailer; second, to produce a device of this kind that will permit the trailer to assume various angular positions with respect to the tractor without materially altering the braking effect; third, to afford facilities for utilizing such a device in connection with the common forms of brake gear applied to vehicles; and, fourth, to accomplish the above in a practical and relatively inexpensive construction.

My objects are attained in the manner illustrated in the accompanying drawings, in which—

Figure 1 is a plan view of portions of a tractor vehicle and connected trailer, with my braking device applied thereto;

Figure 2 is an enlarged side elevation of the control mechanism of my device;

Figure 3 is a cross section of the control mechanism taken on the line 3—3 of Fig. 1; and Figure 4 is a further enlarged cross section taken on the line 4—4 of Fig. 3.

Similar reference numerals refer to similar parts throughout the several views.

In the drawings the rear portion of a vehicle tractor is shown at 5, with an operator's seat 6 thereon. The forward portion of a trailer is shown at 7, coupled to the tractor by draw bar 8. The draw bar is pivotally connected by pins 9 so that the trailer can properly take the curves in the road.

On the deck 5 of the tractor the control device of my trailer brake is mounted. This comprises an inboard pillow block 10, an outboard bearing 11, and a short shaft 12 which is rotatable in these bearings. The shaft carries a brake drum 13, a ratchet wheel 14, and a sleeve 15, all of which are keyed to the shaft. It also carries a spool 16 which is rotatable upon the shaft. A spiral spring 17 within the spool connects it to sleeve 15.

The operating lever 18 has a bifurcated lower end straddling ratchet wheel 14. This lever is pivotally mounted upon sleeve 15 and the inner hub of drum 13. The lever carries a latch 19 for engagement with the teeth of the ratchet wheel, and also a grip 20 by means of which it can be released.

The brake drum is provided with a brake band 21 and foot pedal 22 by means of which the drum may be held. It is preferable to have some convenient means for latching the pedal in its holding position. Such means are well known and do not constitute a part of my present invention, and accordingly have not been illustrated.

The trailer is provided with a longitudinally slidable bar 23, pivotally connected at the rear to equalizer bar 24 of the trailer brake gear. The forward end of bar 23 carries a sheave 25. A second sheave 26 is attached to a corner of the tractor, and a wire rope 27, having one end attached to the other corner of the trailer at 28, passes over the two sheaves and is wound upon spool 16.

From the foregoing description it will be apparent that rope 27 may be tensioned as desired by the use of operating lever 18 and pedal 22. Tension is applied by pulling the lever back, then holding brake drum 13 by means of the pedal, then advancing the lever to take a fresh hold on the ratchet wheel, and repeating the operation.

The tension is applied to rope 27 through spiral spring 17. This provides resilient means for maintaining the tension in rope 27 substantially constant when the trailer swings on curves.

Having thus fully described my invention in a manner that will make its construction and operation clear to those familiar with the art involved, I claim:

1. A device of the character described comprising; a tractor; a trailer swingingly coupled to the tractor and having a brake gear thereon adapted for actuation by a forwardly extending pull rod; a rotatable cable drum upon the tractor; a cable upon the drum having an end attached to the tractor and an intermediate rearwardly extending bight; and a sheave upon said pull rod engaging said bight.

2. A device of the character described comprising; a tractor; a trailer swingingly coupled to the tractor and having a brake gear thereon adapted for actuation by a forwardly extending pull rod; a rotatable cable drum upon the tractor; a cable upon the drum extending rearwardly over a guide sheave at the near rear corner of the tractor to an attachment at the far rear corner; and a sheave upon said pull rod engaging the cable intermediate said attachment and guide sheave.

3. A construction as set forth in claim 2 in combination with means for applying a yielding rotative force to said drum for tensioning said cable.

4. A construction as set forth in claim 2 in combination with a lever and ratchet means for applying a yielding rotative force to said drum for tensioning said cable.

FREDRICK P. DUNN.